United States Patent
Anumala et al.

(10) Patent No.: US 9,131,366 B2
(45) Date of Patent: Sep. 8, 2015

(54) UNIFYING VIRTUALIZATIONS IN A CORE NETWORK AND A WIRELESS ACCESS NETWORK

(75) Inventors: Mohnish Anumala, Littleton, MA (US); Kumara-Das Karunakaran, Santa Clara, CA (US)

(73) Assignee: Avaya Inc., Basking Ridge, NJ (US)

( * ) Notice: Subject to any disclaimer, the term of this patent is extended or adjusted under 35 U.S.C. 154(b) by 1471 days.

(21) Appl. No.: 12/339,404

(22) Filed: Dec. 19, 2008

(65) Prior Publication Data

US 2009/0310535 A1 Dec. 17, 2009

Related U.S. Application Data

(60) Provisional application No. 61/061,356, filed on Jun. 13, 2008.

(51) Int. Cl.
- *H04W 8/26* (2009.01)
- *H04L 12/46* (2006.01)
- *H04W 92/02* (2009.01)

(52) U.S. Cl.
CPC .............. *H04W 8/26* (2013.01); *H04L 12/4662* (2013.01); *H04L 12/4625* (2013.01); *H04L 12/4666* (2013.01); *H04W 92/02* (2013.01)

(58) Field of Classification Search
None
See application file for complete search history.

(56) References Cited

U.S. PATENT DOCUMENTS

| | | | |
|---|---|---|---|
| 5,659,878 A * | 8/1997 | Uchida et al. | 455/426.1 |
| 6,085,238 A * | 7/2000 | Yuasa et al. | 709/223 |
| 6,496,867 B1 * | 12/2002 | Beser et al. | 709/245 |
| 7,493,084 B2 * | 2/2009 | Meier et al. | 455/41.2 |
| 7,499,438 B2 * | 3/2009 | Hinman et al. | 370/338 |
| 7,551,925 B2 * | 6/2009 | Simongini et al. | 455/433 |
| 7,751,329 B2 | 7/2010 | Lapuh | |
| 8,472,420 B2 * | 6/2013 | Zhang | 370/338 |
| 2001/0037384 A1 * | 11/2001 | Jemes et al. | 709/223 |
| 2002/0138628 A1 * | 9/2002 | Tingley et al. | 709/227 |
| 2003/0018820 A1 * | 1/2003 | Ould-Brahim et al. | 709/249 |
| 2003/0152075 A1 * | 8/2003 | Hawthorne et al. | 370/389 |
| 2003/0210671 A1 * | 11/2003 | Eglin | 370/338 |
| 2004/0071122 A1 * | 4/2004 | Svensson et al. | 370/338 |
| 2004/0266427 A1 * | 12/2004 | Kurokawa | 455/426.2 |
| 2005/0053079 A1 * | 3/2005 | Havala | 370/400 |
| 2005/0058118 A1 * | 3/2005 | Davis et al. | 370/351 |
| 2005/0141527 A1 * | 6/2005 | Gateva et al. | 370/401 |
| 2005/0163096 A1 * | 7/2005 | Momona | 370/349 |
| 2005/0165953 A1 * | 7/2005 | Oba et al. | 709/238 |
| 2006/0209831 A1 | 9/2006 | Shepherd | |
| 2006/0245435 A1 | 11/2006 | Sajassi | |
| 2007/0081477 A1 * | 4/2007 | Jakkahalli et al. | 370/310 |
| 2007/0171918 A1 | 7/2007 | Ota | |

(Continued)

OTHER PUBLICATIONS

Korean Intellectual Property Office, International Search Report of International Application No. PCT/US2008/087613 dated May 28, 2009 (2 pages).

Network Working Group, CAPWAP Protocol Specification draft-ietf-capwap-protocol-specification-15, Oct. 2008 (140 pages).

(Continued)

*Primary Examiner* — Dung B Huynh

(74) *Attorney, Agent, or Firm* — Trop Pruner & Hu, P.C.

(57) ABSTRACT

To unify virtualizations in a core network and a wireless access network, a virtual wireless network is mapped to a virtual network in the core network. Based on the mapping, data associated with a communications session can be communicated through the virtual wireless network and core virtual network.

15 Claims, 3 Drawing Sheets

(56) References Cited

U.S. PATENT DOCUMENTS

| | | | |
|---|---|---|---|
| 2007/0230481 A1* | 10/2007 | Ikeda et al. | 370/395.53 |
| 2007/0280243 A1* | 12/2007 | Wray et al. | 370/392 |
| 2008/0132233 A1* | 6/2008 | Li et al. | 455/436 |
| 2008/0170583 A1* | 7/2008 | Sultan et al. | 370/422 |
| 2008/0247406 A1* | 10/2008 | Figueira et al. | 370/401 |
| 2012/0147896 A1* | 6/2012 | Sultan et al. | 370/402 |

OTHER PUBLICATIONS

Don Fedyk and Paul Bottorff, Nortel Networks, Provider Link State Bridging (PLSN), Jan. 2007 (10 pages).

Network Working Group, BGP/MPLS IP Virtual Private Networks (VPNs), Feb. 2006 (40 pages).

J. Osswald et al., U.S. Appl. No. 11/642,202, entitled "Communication Data Units in a Communications Network that Provides Failure Protection," filed Dec. 20, 2006, pp. 1-23, Figs. 1-5.

* cited by examiner

UNIFYING VIRTUALIZATIONS IN A CORE NETWORK AND A WIRELESS ACCESS NETWORK

CROSS-REFERENCE TO RELATED APPLICATIONS

This claims the benefit under 35 U.S.C. §119(e) of U.S. Provisional Application Ser. No. 61/061,356, entitled "Method and Architecture for Extending a Virtualized Campus Core Network to the Edge Using PBT and WLAN," filed Jun. 13, 2008, which is hereby incorporated by reference.

TECHNICAL FIELD

The invention relates generally to unifying virtualizations in a core network and a wireless access network.

BACKGROUND

Communications networks are implemented to enable transport of information among users and devices. Within an enterprise, such as a company, educational organization, or government agency, core networks (metro core networks or campus core networks) are implemented to allow users in different locations (e.g., different offices, different cities, different countries, etc.) to communicate with other users of the enterprise. In some example implementations, a core network can be according to the provider backbone transport (PBT) technology, as defined by the IEEE (Institute of Electrical and Electronics Engineers) 802.1ah standard, and/or according to the Provider Link State Bridging (PLSB) technology, which is a point-to-multipoint technology based on IEEE 802.1ah and a Link State Protocol, also referred to as IS-IS (Intermediate System to Intermediate System) Protocol, which is defined by ISO/IEC 10589:2002 and described in Request for Comments (RFC) 1142, entitled "OSI IS-IS Intra-Domain Routing Protocol," dated February 1990.

Core networks are able to implement layer 2 or layer 3 virtualization, in which multiple virtual networks can be defined on the same physical infrastructure that makes up the core network.

Traditionally, core networks are wired networks that allow access by wired user terminals. However, wireless access technologies are becoming increasingly popular, including wireless local area networks (WLANs) that conform to the IEEE 802.11 standards. Conventionally, an efficient mechanism has not been provided to allow user terminals that are attached to a wireless access network to use virtual networks provided by a wired core network.

SUMMARY

In general, according to an embodiment, a method is provided to unify virtualizations in a core network and a wireless access network, in which virtual wireless networks provided in a wireless access network are mapped to virtual networks provided in a core network.

Other or alternative features will become apparent from the following description, from the drawings, and from the claims.

DETAILED DESCRIPTION

Figure 1:
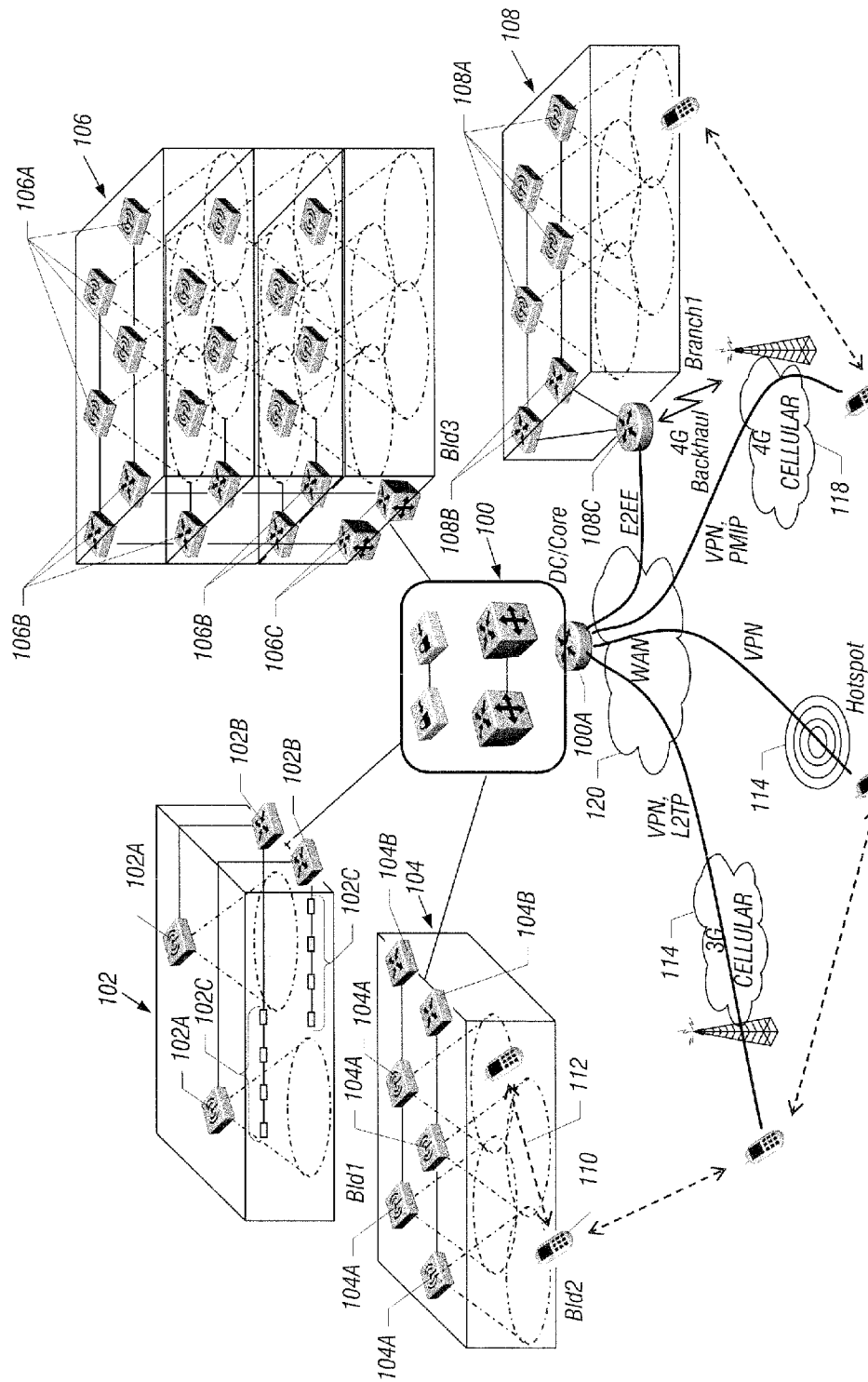
FIG. 1 is a schematic diagram of an exemplary communications network that includes a core network and various wireless access networks in which some embodiments of the invention can be incorporated.

In the following description, numerous details are set forth to provide an understanding of some embodiments. However, it will be understood by those skilled in the art that some embodiments may be practiced without these details and that numerous variations or modifications from the described embodiments may be possible.

In accordance with some embodiments, a technique or mechanism is provided to unify virtualizations provided in a core network and a wireless access network. Virtual wireless networks of the wireless access network can be mapped to virtual networks of the core network. More specifically, an identifier of a particular one of multiple virtual wireless networks (of the wireless access network) can be mapped to an identifier of a particular one of multiple virtual networks (of the core network). Using the mapping, data associated with a communications session involving a first endpoint attached to the wireless access network and a second endpoint that is either in the core network or that is attached to a network coupled to the core network can be communicated through the particular virtual wireless network and the particular virtual network.

In this manner, core network virtualization can be extended to the wireless access network such that uniformity is provided to a mobile end user. The ability to unify virtualizations in a core network and wireless access network will allow for network deployments in which wireless access is used as a primary access technology. With improvements in wireless access technologies wireless access networks are increasingly being used as the primary access networks rather than secondary access networks. With increased deployments of wireless access networks, it is desirable to enable unification of virtualizations in such wireless access networks with virtualizations in the core network provided by enterprises, including companies, educational organizations, government agencies, and so forth.

Also, mapping a virtual wireless network to a core virtual network enables provision of an end-to-end service level agreement for a user or group of users. A service level agreement specifies the expected level of service (including quality of service and other terms) that the core network is to provide for the user or group of users.

In one example, wireless access can be according to the WiFi technology (also referred to as the wireless local area network or WLAN technology), as defined by various IEEE (Institute of Electrical and Electronics Engineers) 802.11 standards, including 802.11a, 802.11b, 802.11g, and 802.11n. The 802.11n is being standardized and will add capacity enhancements to wireless access networks implementing the 802.11n technology. In accordance with some embodiments, reference to "WiFi" or "WLAN" or "wireless local area network" refers to any wireless access network that employs any of the IEEE 802.11 standards, including currently existing standards as well as future standards that evolve from the current standards.

Although reference is made to "WiFi" or "WLAN" in some embodiments, it is noted that the same or similar techniques can be applied to other wireless access technologies.

FIG. 1 illustrates an exemplary communications network that includes a core network 100 and various edge networks, including an edge network 102 in building (Bld1), an edge network 104 in building Bld2, an edge network 106 in building Bld3, and an edge network 108 in a branch office (Branch1). The buildings Bld1, Bld2, and Bld3 can be buildings located on a particular campus of an enterprise, for example. The branch office (Branch1) can be a remote branch office located in a different city or country, for example. In other examples, instead of buildings and branch offices, other types of locations can be associated with corresponding edge networks.

In other examples, the core network 100 and wireless access networks can be provided in the following exemplary contexts: a multi-tenant or multi-guest building; or an airport with multiple providers.

Each of the edge networks 102, 104, 106, and 108 includes a wireless access network that includes corresponding wireless access points. For example, the wireless access network of the edge network 102 includes wireless access points 102A, the wireless access network of the edge network 104 includes wireless access points 104A, the wireless access network of the edge network 106 includes wireless access points 106A, and the wireless access network of the edge network 108 includes wireless access points 108A. A "wireless access point" or "access point" refers to a device having wireless (e.g., radio) transceivers that enable wireless mobile stations to wirelessly connect to the device for the purpose of accessing a network resource. Note that in other implementations, some of the edge networks can include a wired access network in addition to or in place of a wireless access network.

Each wireless access point is associated with a corresponding coverage area, as represented by the dashed ovals in FIG. 1. For example, a mobile station 110 that is in building Bld2 is able to communicate with one of the wireless access points 104A, depending upon the location of the mobile station 110 in building Bld2. As indicated by arrow 112 in FIG. 1, the mobile station 110 can move between different coverage areas associated with different ones of the wireless access points 104A.

Note also that the mobile station 110 can roam to other locations outside building Bld2, including to the coverage area of a cellular network 114, to the coverage area of a WiFi hotspot 116 (such as a hotspot provided at a hotel, coffee shop, etc.), to the coverage area of another cellular network 118, and/or to branch office (Branch1). Although not shown, the mobile station 110 can also move to locations in building Bld1 and building Bld3. In the example of FIG. 1, the cellular network 114 is a 3G cellular network, while the cellular network 118 is a 4G cellular network.

The various networks depicted in FIG. 1 include provider network nodes (e.g., switches, routers, bridges, hubs, etc.) that allow communication between endpoints. For example, the edge network 102 includes edge switches 102B that are connected to the wireless access points 102A as well as to wired endpoints 102C (e.g., computers, servers, etc.). The edge network 104 similarly includes edge switches 104B that are connected to respective wireless access points 104A. The edge network 106 includes edge switches 106B that are connected to respective wireless access points 106A. As further depicted in FIG. 1, the edge network 106 further includes aggregator switches 106C that are each connected to multiple edge switches 106B.

The edge switches 102B, 104B, 106B, and aggregator switches 106C can be layer 2 switches. In alternative embodiments, the switches 102B, 104B, 106B, and 106C can be layer 3 routers. In the ensuing discussion, the term "switch" refers to either a layer 2 or a layer 3 router. A layer 2 switch performs forwarding of data packets at the layer 2 level of the Open System Interconnection (OSI) model, while a layer 3 router performs data packet forwarding at the layer 3 level of the OSI model.

The core network 100 further includes additional switches and other network elements. One of the switches that is part of the core network 100 is an edge router 100A that is connected to a wide area network (WAN) 120. The WAN 120 can be a public network such as the Internet, or other type of network that interconnects geographically distributed locations. The WAN 120 is connected to the cellular network 114, WiFi hotspot 116, cellular network 118, and the edge network 108.

The branch office edge network 108 includes edge switches 108B that are connected to respective wireless access points 108A. The edge switches 108B are in turn connected to an edge router 108C to allow for communication over the WAN 120 to the core network 100. In one example, end-to-end encryption (E2EE) can be used to unify data communications over Ethernet between the branch office edge network 108 and the core network 100, since the WAN 120 can be a public network that is not secure. In other implementations, other forms of encryption can be used to protect data communicated over the WAN 120 between the core network 100 and branch office edge network 108.

In accordance with some embodiments one or more the switches or wireless access points depicted in FIG. 1 can be used to map a virtual wireless network provided in a wireless access network to a virtual network provided in the core network 100. Virtual wireless networks provided in a wireless access network can be implemented by using multiple virtual access points that announce multiple corresponding SSIDs (service set identifiers) to users in the wireless access network. A single physical access point (one of the access points 104 depicted in FIG. 1, for example) can implement multiple virtual access points. Each virtual wireless access point provides a virtual wireless network, and an SSID constitutes an identifier of the corresponding virtual wireless network. A client device (such as the mobile station 110) can receive broadcast messages (called "beacons") from the virtual access points within range of the client device, where the broadcast messages advertise the respective SSIDs. The client device can choose one of the SSIDs to connect based on configuration of the client device, or based on user selection.

Virtual networks in the core network 100 are also identified by respective identifiers, which can be in the form of ISIDs (service instance identifiers). The ISID identifies a service instance, and a service instance refers to a particular L2 or L3 flow of data in the communications network. There can be many service instances active in the communications network, which are assigned corresponding ISIDs.

In accordance with some embodiments, to map virtual wireless networks to core virtual networks, SSIDs are mapped to ISIDs. More generally, first type identifiers used for virtual wireless networks are mapped to second type identifiers (different from the first type identifiers) for core virtual networks.

In some embodiments, the core network 100 implements a provider backbone transport (PBT) technology, as defined by IEEE 802.1ah, and/or a PLSB (provider link state bridging)

technology, as defined by a Link State Protocol (IS-IS) and IEEE 802.1ah. PBT provides a point-to-point traffic tunnel. PBT is based on the Ethernet technology, and provides a connection-oriented, packet-switched transport layer. The provider network nodes in a provider backbone network can associate a packet with a PBT using a backbone VLAN (virtual local area network) identifier (BVID) and provider backbone medium access control (B-MAC) address.

A typical packet format for a PBT network is MAC-in-MAC, as described in EEE 802.1ah. MAC-in-MAC encapsulation is performed on each packet, where a customer MAC header (containing the source and destination MAC addresses of customer network nodes involved in a communication session) is encapsulated within a service provider MAC header (containing the backbone source and destination MAC addresses associated with provider network nodes). MAC-in-MAC allows customer and provider domains to be isolated from each other. The customer domain MAC addresses are used to route packets between customer network nodes, whereas the provider domain MAC addresses are used to route packets among provider network nodes, such as switches, hubs, bridges, and so forth.

PLSB is a mechanism to build virtual networks, such as layer 2 virtual private networks (VPNs) or virtual local area networks (VLANs). Using IS-IS, PLSB is able to create a shortest-path topology based on MAC addresses, and to create a multicast tree for the virtual network domain. PLSB populates forwarding tables to construct shortest path loop-free connectivity for provider backbone networks.

In addition, PBT/PLSB (and other similar metro-scale technologies) provide enforcement of SLAs (e.g., quality of service, latency, etc.) and highly scalable multicasting, which allows for scaling a wireless access network such as a WiFi network across a large campus or a metropolitan area.

It is noted that in other embodiments, other protocols can be used to implement the core network 100.

It is noted that in other embodiments, virtualization can also be provided in the distribution layer that connects the access network to the core network. For example, in FIG. 1, the link between the switches 106C in building Bld3 and the core network switches is an example of a distribution layer. Virtualization can also be provided in backhaul networks, such as a backhaul connection between a metro mesh access network and a metro core network.

Figure 2:
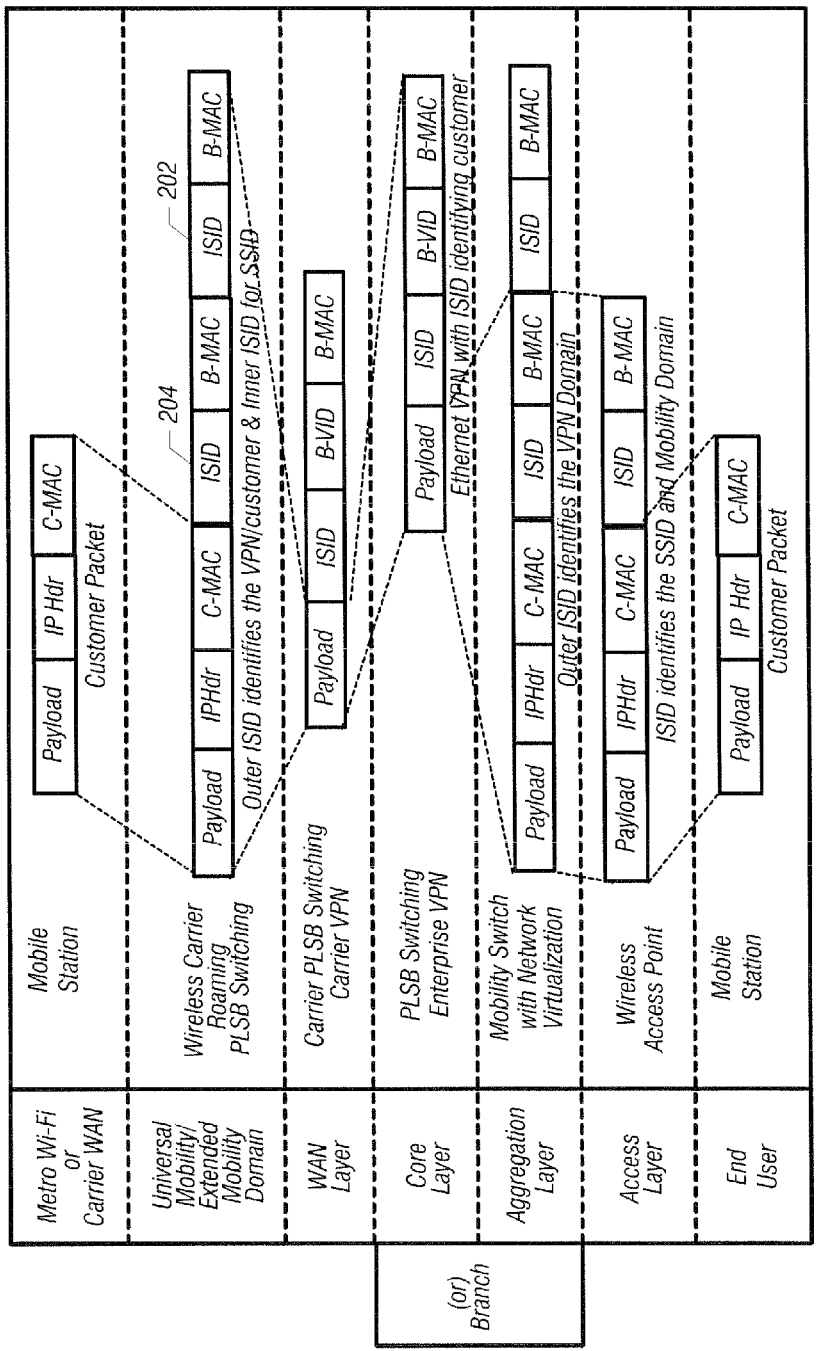
FIG. 2 illustrates contents of packets communicated through various layers of the communications network of FIG. 1.

FIG. 2 shows encapsulations of a customer packet sent by an end user (e.g., mobile station 10) attached to a wireless access network as the customer packet traverses through various layers of a communications network (such as the communications network depicted in FIG. 1). The various layers of the communications network can represent different nodes in the communications network.

The customer packet (shown in the bottom layer of the diagram of FIG. 1) includes a payload, an IP (Internet Protocol) header, and customer MAC (C-MAC) field containing a C-MAC header (C-MAC addresses plus other information). When attached to a wireless access network, the mobile station has selected one of multiple possible virtual wireless networks provided by corresponding virtual access points in the wireless access network. The selected virtual wireless network is associated with a corresponding SSID. The customer packet is targeted to another mobile station (which is in the top layer shown in FIG. 2 or in any other further downstream layer) or to a wired device such as a server in an enterprise or the Internet. To be communicated between the originating and destination mobile stations, the customer packet has to traverse through various layers of the communications network. Also, in accordance with some embodiments, mapping has to be performed between the selected virtual wireless network and a core wireless network.

In the example of FIG. 2, it is assumed that a wireless access point (which corresponds to the access layer depicted in FIG. 2) performs mapping of an SSID to an ISID in the core network domain. In another embodiment, the mapping between SSID and ISID can be performed by a switch instead. The mapping can be performed based on configured information provided in the wireless access point, which can be in the form of a table correlating SSIDs and ISIDs, for example. Another example can be where the mobile device's VLAN information is used for mapping in addition to the SSID. In this case, the table can also include virtual local area network (VLAN) identifiers to unify across wired and wireless access networks.

Based on the mapping, the wireless access point adds an ISID field that contains the ISID that is mapped from the SSID in the mobility domain. This ISID field is referred to as an "inner" ISID field, since later on an outer ISID field may be added at another layer. Also, the wireless access point adds a backbone MAC (B-MAC) field that contains a B-MAC header (containing B-MAC addresses and other information) to the packet. B-MAC addresses are MAC addresses of the provider domain (the provider of the core network 100), while C-MAC addresses are addresses in the customer domain. The packet generated at the access layer in FIG. 2 is MAC-in-MAC encapsulated, since the C-MAC field is encapsulated within the B-MAC field.

The next layer depicted in FIG. 2 is an aggregation layer, which can be provided by any of the edge switches or aggregator switches depicted in FIG. 1, for example. At the aggregation layer, a switch further adds an outer ISID field (to identify the virtual domain in the core network) and an outer B-MAC field. The virtual domain identified by the outer ISID field can be a VRF (virtual routing and forwarding) domain or an L2 VPN (virtual private network) domain.

Next, at the core layer, another field is added, in the form of a backbone virtual network identifier (B-VID). As mentioned above, the customer packet is targeted to another mobile station attached to another wireless access network (depicted as the top layer in FIG. 2). For example, the destination mobile station can be attached to a metro mesh WiFi network or a carrier WAN (e.g., any of the edge wireless access networks, cellular networks 114, 118, WiFi hotspot 116 depicted in FIG. 1). The packet is sent from the core layer to the WAN layer, which can correspond to the edge router 100A, for example. At the WAN layer, the packet sent by the core layer is encapsulated as payload and outer ISID, B-VID, and B-MAC fields are added. The packet is then sent from the WAN layer to a mobility domain, where the payload sent by the WAN layer is extracted. In the extracted packet, the outer ISID field 202 identifies the virtual domain, and the inner ISID field 204 identifies the SSID. The original customer packet is then extracted and sent to the destination mobile station.

Using techniques according to some embodiments, it is possible to map a virtual wireless network to a virtual routing domain (e.g., VRF domain or L2 VPN domain), which allows for traffic separation and differentiated services. For example, a user can be assigned a "guest" SSID, while an employee of an enterprise can be assigned an employee SSID. This allows for different routing domains so that guest users are isolated from the secure routing paths within an enterprise core network. VRF is a technology used in networks that allows multiple instances of a routing table to co-exist within the same router at the same time.

Note that it is also possible for a mobile station to be seamlessly transferred between different wireless access points as the mobile station moves between different coverage areas. As the mobile station roams between different physical access points, the SSID-to-ISID mapping can remain the same, such as the SSID-to-ISID mapping maintained in an edge switch or aggregator switch.

Figure 3:
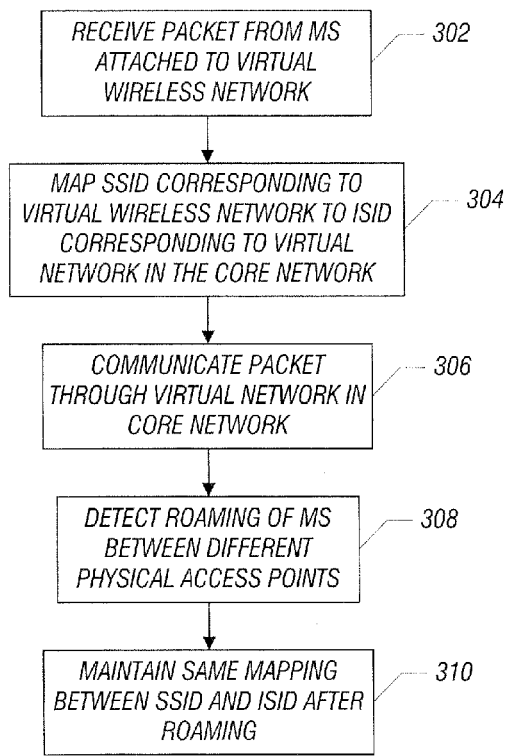
FIG. 3 is a flow diagram of a process of unifying virtualizations in a core network and wireless access network, according to an embodiment.

FIG. 3 is a flow diagram of a procedure performed by a network node, in accordance with an embodiment. The network node can be a wireless access point or a switch, including any of the wireless access points or switches depicted in FIG. 1.

The network node receives (at 302) a packet from a mobile station that is attached to a virtual wireless network. The virtual wireless network is associated with an SSID. Upon receipt of the packet from the mobile station, the network node maps (at 304) the SSID corresponding to the virtual wireless network to an ISID corresponding to a core virtual network. The packet is then communicated (at 306) through the core virtual network to an end point that is either in the core network or is attached to another network coupled to the core network. As discussed in connection with FIG. 2, the destination endpoint can be another mobile station attached to another wireless access network.

The network node is also able to detect (at 308) roaming of the mobile station between different physical access points as the mobile station roams between different coverage areas. Upon detecting roaming of the mobile station between different access points, the network node maintains (at 310) the same mapping between SSID and ISID such that subsequent packets of the mobile station are communicated through the same virtual wireless network and the same core virtual network.

Figure 4:
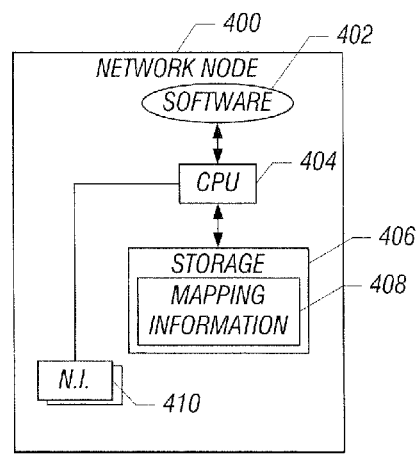
FIG. 4 is a block diagram of components of a communications node in the communications network of FIG. 1, in accordance with an embodiment.

FIG. 4 depicts a network node 400 according to an embodiment, where the network node 400 can be any of the wireless access points or switches depicted in FIG. 1. The network node 400 includes software 402 that is executed on one or more central processing units (CPUs) 404 to perform various tasks of the network node 400, including tasks discussed above. The CPU(s) 404 is (are) connected to a storage 406, which contains mapping information 408 to allow the network node to perform mapping between virtual wireless networks and core virtual networks.

The network node 400 also includes network interfaces 410 to couple the network node 400 to corresponding network links.

In other embodiments, techniques as described herein can also be used to seamlessly integrate regions of wireless access networks (e.g., WiFi networks) into a larger-scale network with seamless mobility. In this implementation, a "cloud" of the regions of wireless access networks can be coupled by a gateway mobility switch to the core network (e.g., core network 100 in FIG. 1). The gateway mobility switch can then perform the mapping between the SSIDs and ISIDs.

Instructions of the software 402 are loaded for execution on a processor. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of unifying virtualizations in a core network and a wireless access network, comprising:
   providing a plurality of virtual wireless networks provided by corresponding virtual access points in the wireless access network;
   providing a plurality of virtual networks in the core network; and
   mapping a service set identifier (SSID) of a particular one of the plurality of virtual wireless networks to a service instance identifier (ISID) of a particular one of the plurality of virtual networks, where the mapping uses a data structure that contains the SSID and the ISID, the data structure correlating the SSID to the ISID;
   using the mapping to communicate data associated with a communications session involving a mobile station and another endpoint through the particular virtual wireless network and the particular virtual network;
   detecting transfer of the mobile station from a first physical access point to a second physical access point in the wireless access network; and
   maintaining the mapping between the SSID and the ISID in the data structure in response to the transfer.

2. The method of claim 1, wherein the mapping enables mapping of the particular virtual wireless network to a virtual routing domain of the core network, wherein the virtual routing domain is separate from another virtual routing domain of the core network.

3. The method of claim 1, wherein providing the plurality of virtual wireless networks in the wireless access network comprises providing the plurality of virtual wireless networks in a WiFi network.

4. The method of claim 3, wherein providing the plurality of virtual networks in the core network comprises providing the plurality of virtual networks in the core network implemented with one or both of PBT (provider backbone transport) and PLSB (provider link state bridging) technologies.

5. The method of claim 1, wherein multiple virtual access points of the virtual access points are provided by a physical access point.

6. The method of claim 1, wherein mapping the SSID of the particular virtual wireless network to the ISID of the particular virtual network in the core network enables provision of an end-to-end service level agreement.

7. The method of claim 1, further comprising:
   integrating multiple wireless access networks each having virtual wireless networks; and
   mapping between the virtual wireless networks of the integrated wireless access networks and the virtual networks of the core network.

8. The method of claim 1, wherein the data structure includes additional identifiers of corresponding ones of the plurality of virtual wireless networks correlated to additional identifiers of corresponding ones of the plurality of virtual networks.

9. The method of claim 8, wherein the data structure is a table.

10. A network node for use with a communications network that includes a wireless access network and a core network, comprising:
an interface to receive a packet from a mobile station; and
a processor to:
determine a service set identifier (SSID) of a virtual wireless network provided by a virtual access point in the wireless access network that the mobile station is attached to;
map, using a data structure, the SSID to a service instance identifier (ISID) of a virtual network in the core network, where the data structure contains the SSID and the ISID, the data structure correlating the SSID to the ISID;
send the packet to the core network after the mapping;
detect transfer of the mobile station from a first physical access point to a second physical access point in the wireless access network; and
maintain the mapping between the SSID and the ISID after the transfer.

11. The network node of claim 10, comprising a physical wireless access point that implements the virtual access point and another virtual access point.

12. The network node of claim 10, wherein the data structure includes additional identifiers of corresponding virtual wireless networks correlated to additional identifiers of corresponding virtual networks.

13. An article comprising at least one non-transitory computer-readable storage medium containing instructions that when executed cause a network node to:
determine a service set identifier (SSID) of a virtual wireless network provided by a virtual access point in a wireless access network that a mobile station is attached to;
map, using a data structure, the SSID to a service instance identifier (ISID) of a virtual network in a core network, where the data structure contains the SSID and the ISID, the data structure correlating the SSID to the ISID;
send a packet from the mobile station to the core network after the mapping;
detect transfer of the mobile station from a first physical access point to a second physical access point in the wireless access network; and
maintain the mapping between the SSID and the ISID in the data structure in response to the transfer.

14. The article of claim 13, wherein the instructions when executed cause the network node to further:
map, using the data structure, another identifier of another virtual wireless network provided by another virtual access point in the wireless access network to another identifier of another virtual network in the core network, where the data structure contains the another identifier of the another virtual wireless network and the another identifier of the another virtual network.

15. The article of claim 13, wherein the virtual access point and at least another virtual access point are implemented on a physical access point.

\* \* \* \* \*